United States Patent [19]

Gunter

[11] Patent Number: 5,320,066

[45] Date of Patent: Jun. 14, 1994

[54] PEST REPELLANT PET BEDDING OF WHITE CEDAR SHAVINGS TREATED WITH WHITE CEDAR OIL

[76] Inventor: Lori E. Gunter, General Delivery, Shining Tree, Ontario, Canada, P0M 2X0

[21] Appl. No.: 987,203

[22] Filed: Dec. 8, 1992

[51] Int. Cl.⁵ .............................................. A01K 29/00
[52] U.S. Cl. .................................. 119/28.5; 119/171; 424/419; 424/DIG. 10; 428/907; 514/919
[58] Field of Search ............... 119/28.5, 28, 171, 172, 119/173, 156; 5/448, 461, 484; 424/411, 419, DIG. 10; 514/918, 919; 428/907

[56] References Cited

U.S. PATENT DOCUMENTS

| | | | |
|---|---|---|---|
| 69,376 | 10/1867 | Walton | 119/28.5 |
| 119,105 | 9/1871 | Bailey | 428/907 |
| 676,375 | 6/1901 | Whipple | 428/907 |
| 3,941,090 | 3/1976 | Fry | 119/171 |
| 4,193,986 | 3/1980 | Cox | 424/411 |
| 4,961,930 | 10/1990 | Perdelwitz, Jr. et al. | 424/411 |
| 5,017,377 | 5/1991 | Sikinami et al. | 514/919 |
| 5,044,324 | 9/1991 | Morgan et al. | 119/171 |
| 5,106,622 | 4/1992 | Sherwood et al. | |
| 5,154,594 | 10/1992 | Gamlen | 119/171 |

OTHER PUBLICATIONS

L. L. Bean mail order catalogue (presumed date 1992).

Primary Examiner—Gene Mancene
Assistant Examiner—Todd E. Manahan
Attorney, Agent, or Firm—Jane Parsons

[57] ABSTRACT

A mattress or bed for pets is stuffed with material treated with white cedar oil. Preferably the stuffing comprises cedar shavings and conveniently a washable, removable outer cover is provided over an inner mattress. The cedar oil is environmentally safe, reduces pet odor and acts as an insect and pest repellent.

5 Claims, 1 Drawing Sheet

PEST REPELLANT PET BEDDING OF WHITE CEDAR SHAVINGS TREATED WITH WHITE CEDAR OIL

BACKGROUND OF THE INVENTION

1. Field of the Invention

This invention relates to mattresses for pets filled with white cedar shavings or other materials suitable as stuffing treated with white cedar oil which acts as a pest and odor repellent and is safe for domestic animals, humans and the environment.

2. Acknowledgement of prior art

Pet mattresses or beds are used to provide comfort and odor protection for domestic animals. These have traditionally been manufactured with polyurethane fillings or other fillings such as red cedar chips, which are uncomfortable, unsafe for the animal or are unable to provide parasite repellency and/or offer enhanced deodorizing characteristics.

Studies done by Proctor & Gamble reveal that red cedar contains a poisonous substance which is harmful to animals. Therefore, oil from red cedar is undesirable to treat the mattress.

Although polyurethane fillings and other fillings such as hay or straw may provide the necessary comfort for the pet, they do not exhibit any notable insect repellency characteristics which are at least desirable in a pet mattress.

Many insect repellents have been developed using toxic or noxious substances such as moth repellents for furs and woollen goods. These may be unsuitable for mattresses for domestic animals due to their toxicity.

U.S. Pat. No. 5,106,622 describes a topical pest repellent made of a mixture of natural oils of citronella, cedar and wintergreen in a non-toxic carrier such as olive oil. The mixture is non-toxic and is effective against diverse species, including mosquitoes and ticks The mixture's effectiveness however, was tested on humans only.

U.S. Pat. No. 4,193,986 describes a flea treatment composition, of which the major component is inert. The active fraction is made of pennyroyal, eucalyptus oil, cedar oil, citronella oil and oil of rue. The substance was designed for use on animals previously infected with fleas.

SUMMARY OF THE INVENTION

It has now surprisingly been found that the addition of white cedar oil to the stuffing of a pet mattress may be generally acceptable to the pets, generally non-toxic to them, and effective in keeping them clear of fleas.

Accordingly, the invention provides pet bedding treated with white cedar oil. Preferably, the bedding is a mattress stuffed with cedar particles, for example sawdust, shavings or chips. In fact shavings are preferred, since they provide resilient bedding with little risk of splinters and are not so heavy as sawdust. White cedar shavings are especially preferred.

The mattress may be provided with a removable, washable outer cover.

White cedar oil is effective in very small quantities and at least for this reason need only be used in very small quantities. For convenience of application it is suitable to mix the white cedar oil with a diluent oil prior to treating the bedding The white cedar oil may be mixed with olive oil or mineral oil such as baby oil in a quantity of, for example ¼ ounce of cedar oil in 1 pint of diluent oil. Suitably, for a pet mattress containing three to five pounds of shavings, 1 tablespoonful of the mixture of white cedar oil and diluent oil may provide effective pest repellency. It is clear that the actual amounts of the mixture depend upon the concentration of white cedar oil in the mixture and upon the size of the mattress and the degree of insect repellency required.

The invention includes a method of treatment of pet bedding with an amount of white cedar oil sufficient to impart a degree of insect repellency to the bedding. The white cedar oil may be applied in a mixture with diluent oil in any convenient manner, as by spraying, sprinkling or pouring a pre-chosen amount of the mixture onto the bedding. When the bedding is particulate material such as shavings, the bedding may be agitated and shaken to distribute the oil mixture throughout.

It is clear that the proportion of white cedar oil in the mixture should be sufficient that it is not necessary to use so much of the mixture that an oily feel is imparted to the bedding.

BRIEF DESCRIPTION OF THE DRAWINGS

An embodiment of the present invention will now be described by way of example with reference to the drawings, in which.

DETAILED DESCRIPTION OF A PREFERRED EMBODIMENT

Figure 1:
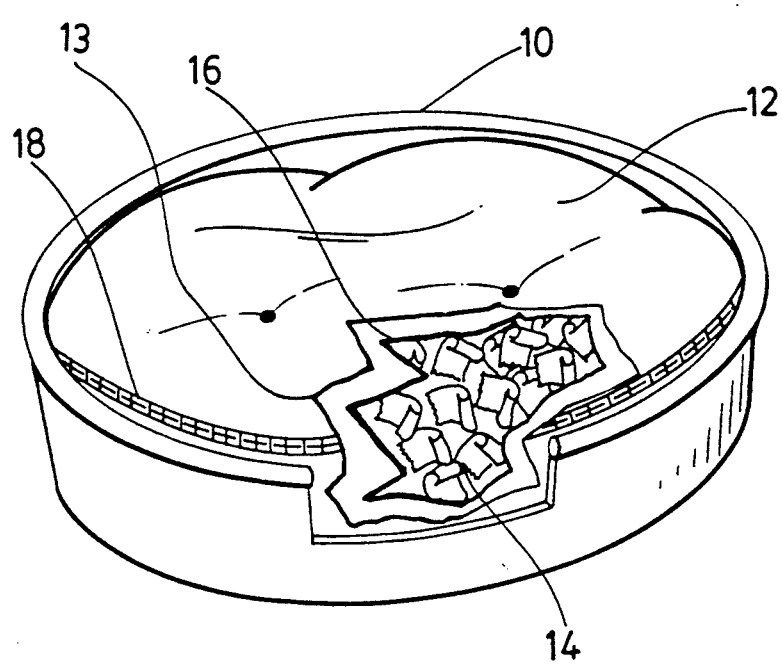
FIG. 1 is an illustrative view of a pet mattress according to the invention in a pet bed, part of the mattress cover being broken away to show the stuffing.

The drawing shows a dog bed 10 having a cushion or mattress 12. The mattress is provided with an outer cover 13 having a zipper 18 or other fastening. The outer cover 13 is removable so that it may be washed and conveniently may be made of porous material to allow permeation of the cedar oil vapors. More conveniently, for durability, the bottom of the outer cover may be made of denim for durability and the top may be made of a decorative cotton blend.

The inner mattress 16 may again be made of any convenient porous material and, for use by a medium size dog, may be filled with three to five pounds of 100% white cedar shavings 14, which are long and stringy in appearance. The cedar shavings 14 may be produced by cutting white cedar blocks lengthwise The shavings are readily available as a side product from the manufacture of white cedar shingles. The shavings provide a soft cushiony effect which are sliver free and suitable for use as bedding. It will be appreciated that for pets of different sizes, different weights of stuffing material will be used and the proportion of mixture of white cedar oil and diluent oil may be adjusted accordingly.

White cedar oil has a very concentrated effect in small quantities and, while it may be used directly in undiluted form, it may be tend to be concentrated in parts of the bedding if used in this manner It may be preferred that a small quantity of cedar oil is mixed with a larger quantity of diluent oil prior to use, so that the white cedar oil will be better distributed throughout the bedding For example, ¼ ounce white cedar oil may be mixed with one pint of diluent oil such as olive oil or mineral oil such as baby oil. One tablespoonful of this mixture may be applied to bedding weighing for example three to five pounds. A greater amount of the mixture may be used as desired, but care should be taken to avoid greasy marks on the mattress. If smaller quantities of the mixture are used care should be taken that the quantities are not so small that insect repellant characteristics are lost.

The application of the mixture to the bedding may be by any convenient means. Thus it may be sprayed, sprinkled or poured onto the bedding When the bedding is cedar shavings it is very convenient to shake the shavings to further distribute the cedar oil throughout their bulk.

The white cedar oil itself may be extracted from white cedar leaf at a strength of 60%. Such oil from white cedar leaf has been tested and proven to be safe for both animals and humans as well as in the environment. Also, white cedar oil has been tested and proven to be effective in repelling insects such as fleas, ticks, mosquitoes, black flies, etc. and in reducing animal odor.

Regeneration of the stuffing is possible by further treatment with white cedar oil if desired Such regeneration is unlikely to be necessary at periods of less than one year.

I claim:

1. Pet bedding having stuffing comprising white cedar shavings treated with white cedar oil in an amount sufficient to provide insect repellency to the pet bedding.

2. Bedding as claimed in claim 1 in which the white cedar oil is admixed with a diluent oil.

3. Bedding as claimed in claim 2 in which the white cedar oil is mixed with the diluent oil in an amount of approximately ¼ ounce white cedar oil to one pint of diluent oil.

4. Bedding as claimed in claim 2 in which the diluent oil is olive oil or mineral oil.

5. Bedding as claimed in claim 2 in which the mixture of white cedar oil and diluent oil is used in an amount of about 1 tablespoonful per three to five pounds of bedding.

* * * * *